(12) United States Patent
Ishii et al.

(10) Patent No.: US 11,421,847 B2
(45) Date of Patent: Aug. 23, 2022

(54) LENS FOR HEADLAMPS OF VEHICLES AND METHOD OF USING LENS FOR HEADLAMPS OF VEHICLES

(71) Applicant: NALUX CO., LTD., Osaka (JP)

(72) Inventors: Kenta Ishii, Osaka (JP); Norihisa Sakagami, Osaka (JP); Daisuke Seki, Osaka (JP)

(73) Assignee: NALUX CO., LTD., Osaka (JP)

( * ) Notice: Subject to any disclaimer, the term of this patent is extended or adjusted under 35 U.S.C. 154(b) by 524 days.

(21) Appl. No.: 16/516,335

(22) Filed: Jul. 19, 2019

(65) Prior Publication Data

US 2019/0338908 A1 Nov. 7, 2019

Related U.S. Application Data

(63) Continuation-in-part of application No. PCT/JP2018/005287, filed on Feb. 15, 2018.
(Continued)

(51) Int. Cl.
*G02B 27/00* (2006.01)
*F21S 41/275* (2018.01)

(52) U.S. Cl.
CPC ........ *F21S 41/275* (2018.01); *G02B 27/0056* (2013.01)

(58) Field of Classification Search
CPC ..... F21S 41/275; G02B 27/0056; G02B 3/08; G02B 27/4216
See application file for complete search history.

(56) References Cited

U.S. PATENT DOCUMENTS

| 6,870,805 | B1 | 3/2005 | Arai et al. |
| 2001/0008513 | A1 | 7/2001 | Arai et al. |

(Continued)

FOREIGN PATENT DOCUMENTS

| EP | 1 022 731 A2 | 7/2000 |
| EP | 1 100 078 A2 | 5/2001 |

(Continued)

OTHER PUBLICATIONS

International Search Report and Written Opinion dated Oct. 16, 2018 corresponding to International Patent Application No. PCT/JP2018/030200, and partial English translation thereof.
(Continued)

*Primary Examiner* — Robert E. Tallman
(74) *Attorney, Agent, or Firm* — Squire Patton Boggs (US) LLP

(57) ABSTRACT

A lens for headlamps of vehicles provided with a diffraction grating on a surface, wherein a phase function of the diffraction grating is represented by $$\phi(r) = \sum_{i=1}^{N} \beta_{2i} r^{2i}$$

where r represents distance from the central axis of the lens, and the relationship $$|\beta_2| \cdot (0.3R)^2 < |\beta_4| \cdot (0.3R)^4$$

is satisfied where R represents effective radius of the lens, and wherein a second derivative of the phase function has at least one extreme value and at least one point of inflection (Continued)

where r is greater than 30% of R, a difference in spherical aberration between the maximum value and the minimum value at any value of r in $$0 \leq r \leq R$$

is equal to or less than the longitudinal chromatic aberration for visible light, the diffraction grating is at least partially on the surface where r is greater than 30%, and the relationship $$1 < \left|\frac{\phi(R)}{R^2}\right| < 10$$

is satisfied.

9 Claims, 10 Drawing Sheets

Related U.S. Application Data

(60) Provisional application No. 62/459,253, filed on Feb. 15, 2017.

(56) References Cited

U.S. PATENT DOCUMENTS

| | | |
|---|---|---|
| 2004/0027969 A1 | 2/2004 | Arai et al. |
| 2004/0095874 A1 | 5/2004 | Arai et al. |
| 2004/0095875 A1 | 5/2004 | Arai et al. |
| 2004/0136309 A1 | 7/2004 | Arai et al. |
| 2004/0257959 A1 | 12/2004 | Arai et al. |
| 2005/0254397 A1 | 11/2005 | Arai et al. |
| 2006/0007837 A1 | 1/2006 | Arai et al. |
| 2008/0137514 A1 | 6/2008 | Arai et al. |
| 2008/0175128 A1 | 7/2008 | Arai et al. |
| 2008/0316900 A1 | 12/2008 | Arai et al. |
| 2009/0016195 A1 | 1/2009 | Arai et al. |
| 2009/0147362 A1 | 6/2009 | Saito |
| 2012/0300301 A1 | 11/2012 | Ando et al. |
| 2014/0029287 A1 | 1/2014 | Anzai et al. |

FOREIGN PATENT DOCUMENTS

| | | |
|---|---|---|
| EP | 1 118 986 A2 | 7/2001 |
| EP | 1 182 653 A1 | 2/2002 |
| EP | 1 369 855 A2 | 12/2003 |
| EP | 1 369 856 A2 | 12/2003 |
| EP | 1 381 035 A2 | 1/2004 |
| EP | 1 381 037 A2 | 1/2004 |
| EP | 2 690 348 A2 | 1/2014 |
| JP | 2000-221434 A | 8/2000 |
| JP | 2009-139897 A | 6/2009 |
| JP | 4649572 B2 | 3/2011 |
| JP | 4775674 B2 | 9/2011 |
| JP | 4798529 B2 | 10/2011 |
| JP | 2013-011909 A | 1/2013 |
| JP | 2014-026741 A | 2/2014 |
| JP | 2017-026787 A | 2/2017 |

OTHER PUBLICATIONS

International Search Report and Written Opinion dated May 15, 2018 corresponding to International Patent Application No. PCT/JP2018/005287, and partial English translation thereof.

LENS FOR HEADLAMPS OF VEHICLES AND METHOD OF USING LENS FOR HEADLAMPS OF VEHICLES

CROSS REFERENCE TO RELATED APPLICATION

This is a Continuation-in-Part of International Patent Application No. PCT/JP2018/005287 filed Feb. 15, 2018, which designates the U.S., and which claims priority from U.S. Provisional Patent Application No. 62/459,253, filed on Feb. 15, 2017. The contents of these applications are hereby incorporated by reference.

TECHNICAL FIELD

The present invention relates to a lens for headlamps of vehicles and a method of using the lens for headlamps of vehicles.

BACKGROUND ART

Lenses for headlamps of vehicles disadvantageously cause color bleeding at the periphery of an area which is designed to be illuminated and around the boundary between an illuminated area and an unilluminated area. In order to reduce such color bleeding, chromatic aberrations of lenses must be corrected. Under the above-described situation, a lens having a surface provided with a diffraction grating for correction of chromatic aberrations has been developed (for example JP2014-26741A).

However, lenses provided with a diffraction grating have the following problems First, so-called glare is generated by diffracted light of unintended orders of diffraction. The reason why the diffracted light of unintended orders of diffraction are generated is that diffraction efficiency changes depending on a position on a lens surface and an angle of incidence of a ray to the lens, and energy transfers to the diffracted light of unintended orders of diffraction. Secondly, a diffraction grating deteriorates transmittance.

A lens for headlamps of vehicles with a diffraction grating for correction of chromatic aberrations, the lens generating no glare and being capable of restraining deterioration in transmittance to a sufficient degree has not been developed.

Under the above-described situation, there is a need for a lens for headlamps of vehicles with a diffraction grating for correction of chromatic aberrations, the lens generating no glare and being capable of restraining deterioration in transmittance to a sufficient degree. The object of the present invention is to provide a lens for headlamps of vehicles with a diffraction grating for correction of chromatic aberrations, the lens generating no glare and being capable of restraining deterioration in transmittance to a sufficient degree.

SUMMARY OF THE INVENTION

A lens for headlamps of vehicles according to a first aspect of the present invention is provided with a diffraction grating on a surface, wherein a phase function of the diffraction grating is represented by $$\phi(r) = \sum_{i=1}^{N} \beta_{2i} r^{2i}$$

where r represents distance from the central axis of the lens, ß represents coefficients, and N and i represent natural numbers, and the relationship $$|\beta_2|\cdot(0.3R)^2 < |\beta_4|\cdot(0.3R)^4$$

is satisfied where R represents effective radius of the lens, and wherein a second derivative of the phase function represented using r has at least one extreme value and at least one point of inflection in the range of r where r is greater than 30% of the effective radius of the lens, a difference in spherical aberration between the maximum value and the minimum value at any value of r in $$0 \le r \le R$$

is equal to or less than the longitudinal chromatic aberration for any value of wavelength of visible light, the diffraction grating is at least partially on the surface in the range of r where r is greater than 30%, and the relationship $$1 < \left|\frac{\phi(R)}{R^2}\right| < 10$$

is satisfied.

In the lens for headlamps of vehicles according to the first aspect of the present invention, by making the coefficient $\beta_2$ of the second order term of r of the phase function relatively small such that the spherical curvature corresponding to the second order term is made relatively small, glare due to the diffraction lights besides the light of the designed order can be reduced. Further, the lens according to the first aspect of the present invention is configured such that the diffraction grating is provided at least partially on the surface in the range of r where r is greater than 30%, and a second derivative of the phase function represented using r has at least one extreme value and at least one point of inflection in the above-described range. As a result, the chronical aberrations in the above-described range can be reduced while restraining decrease in transmittance of light through the lens.

In the lens according to the first aspect of the present invention, the amount corresponding to the density of diffraction grating $$\left|\frac{\phi(R)}{R^2}\right|$$

satisfies the following relationship.

$$1 < \left|\frac{\phi(R)}{R^2}\right| < 10$$

As a result, a lens with which chronical aberrations can be corrected to a sufficient degree and a high intensity of light can be obtained in an optical system in which the lens is combined with a light source can be obtained.

In a lens for headlamps of vehicles according to a first embodiment of the first aspect of the present invention, a second derivative of the phase function represented using r has at least one extreme value and at least one point of inflection in the range of r where r is greater than 50% of the effective radius of the lens, and the diffraction grating is at least partially on the surface in the range of r where r is greater than 50%.

In a lens for headlamps of vehicles according to a second embodiment of the first aspect of the present invention, the relationship $$0 < \frac{\beta_6^2}{\beta_4 \beta_8} < 5$$

is satisfied.

In a lens for headlamps of vehicles according to a third embodiment of the first aspect of the present invention, ß$_4$ and ß$_8$ are negative and ß$_6$ is positive.

In a lens for headlamps of vehicles according to a fourth embodiment of the first aspect of the present invention, depth of the diffraction grating is corrected depending on r.

In a lens for headlamps of vehicles according to a fifth embodiment of the first aspect of the present invention, the relationship $$1 < \left| \frac{\phi(R)}{R^2} \right| < 7.5$$

is further satisfied.

In the lens according to the present embodiment, the amount corresponding to the density of diffraction grating $$\left| \frac{\phi(R)}{R^2} \right|$$

further satisfies the following relationship.

$$1 < \left| \frac{\phi(R)}{R^2} \right| < 7.5$$

As a result, a lens which has a higher efficiency and a greater pitch of the diffraction grating and is easy to machine can be obtained.

In a lens for headlamps of vehicles according to a sixth embodiment of the first aspect of the present invention, the both side surfaces are convex.

In a lens for headlamps of vehicles according to a seventh embodiment of the first aspect of the present invention, effective diameter of the lens ranges from 40 millimeters to 100 millimeters.

For use for headlamps of vehicles, effective diameter of the lens should preferably be in the range from 40 millimeters to 100 millimeters.

A method of using a lens provided with a diffraction grating on a surface for headlamps of vehicles according to a second aspect of the present invention includes the step of, combining the lens with a light source, wherein a phase function of the diffraction grating is represented by $$\phi(r) = \sum_{i=1}^{N} \beta_{2i} r^{2i}$$

where r represents distance from the central axis of the lens, ß represents coefficients, and N and i represent natural numbers, and the relationship $$|\beta_2| \cdot (0.3R)^2 < |\beta_4| \cdot (0.3R)^4$$

is satisfied where R represents effective radius of the lens, and wherein a second derivative of the phase function represented using r has at least one extreme value and at least one point of inflection in the range of r where r is greater than 30% of the effective radius of the lens, a difference in spherical aberration between the maximum value and the minimum value at any r in $$0 \leq r \leq R$$

is equal to or less than the longitudinal chromatic aberration for any value of wavelength of visible light, the diffraction grating is at least partially on the surface in the range of r where r is greater than 30%, and the relationship $$1 < \left| \frac{\phi(R)}{R^2} \right| < 10$$

is satisfied.

In the method of using a lens provided with a diffraction grating on a surface for headlamps of vehicles according to the second aspect of the present invention, by making the coefficient ß$_2$ of the second order term of r of the phase function relatively small such that the spherical curvature corresponding to the second order term is made smaller, glare due to the diffraction lights besides the light of the designed order can be reduced. Further, in the method of using a lens provided with a diffraction grating on a surface for headlamps of vehicles according to the second aspect of the present invention, the lens is configured such that the diffraction grating is provided at least partially on the surface in the range of r where r is greater than 30%, and a second derivative of the phase function represented using r has at least one extreme value and at least one point of inflection in the above-described range. As a result, the chronical aberrations in the above-described range can be reduced while restraining decrease in transmittance of light through the lens.

In the method of using a lens provided with a diffraction grating on a surface for headlamps of vehicles according to the second aspect of the present invention, the amount corresponding to the density of diffraction grating $$\left| \frac{\phi(R)}{R^2} \right|$$

satisfies the following relationship.

$$1 < \left| \frac{\phi(R)}{R^2} \right| < 10$$

As a result, in an optical system in which the lens is combined with the light source, chronical aberrations can be corrected to a sufficient degree and a high intensity of light can be obtained.

DESCRIPTION OF EMBODIMENTS

Figure 1:
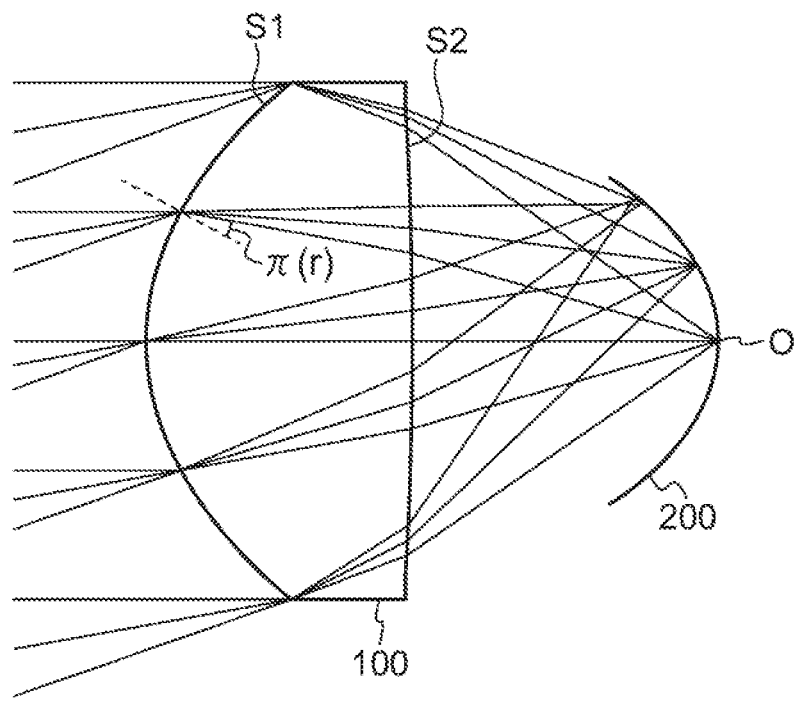
FIG. 1 illustrates a lens according to an embodiment of the present invention.

FIG. 1 illustrates a lens 100 according to an embodiment of the present invention. Rays of light travelling from a light source 200 are projected through the lens 100. The surface on the light source side of the lens is represented by S2, and the surface on the opposite side of the lens from the light source is represented by S1. The surfaces S1 and S2 are represented by the following even function for an aspheric surface.

$$S(r) = \frac{cr^2}{1 + \sqrt{1 - (1+k)c^2 r^2}} + \sum_{i=1}^{N} \alpha_{2i} r^{2i} \tag{1}$$

S(r) represents a coordinate in the direction of the central axis of a lens, the origin being fixed at the vertex of a lens surface, r represents distance from the central axis, c represents curvature at the center of the surface, k represents a conic constant, a represents coefficients, and N and i represent natural numbers. The central axis of the lens is defined as the optical axis. In FIG. 1, a coordinate represented by S(r) is defined as positive when the coordinate is on the right side of the vertex of the lens surface. In FIG. 1, the center of the light source 200 is represented by O. The surfaces S1 and S2 are axially symmetric with respect to the optical axis.

Figure 2:
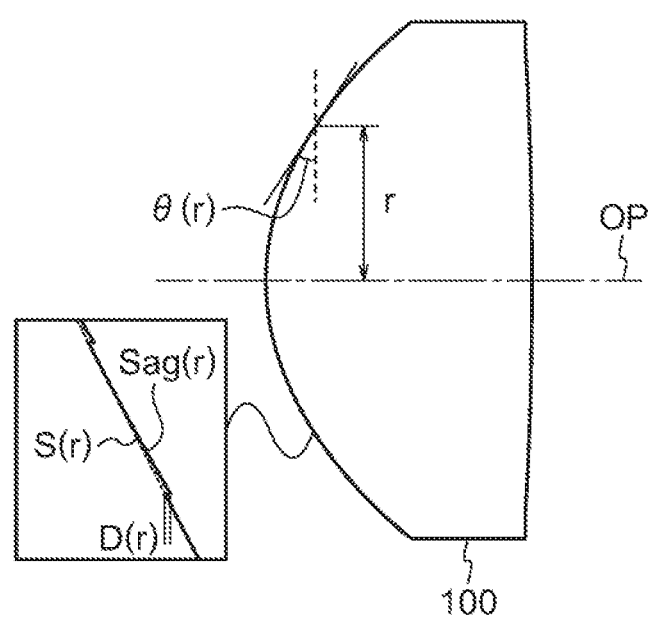
FIG. 2 illustrates a tangential angle of a lens surface.

FIG. 2 illustrates a tangential angle of a lens surface. The tangential angle θ is an angle formed by a tangential line on a lens surface and the direction perpendicular to the optical axis in a cross section containing the optical axis of the lens and is represented by the following equation.

$$\theta(r) = \tan^{-1}\frac{dS}{dr} \tag{2}$$

Lenses according to embodiments of the present invention are provided with a diffraction grating (a diffraction structure) on the surface S1 or the surface S2.

In general, the following relationship holds among pitch P of a transmission-type diffraction grating, angle of incidence $\theta_{in}$, diffraction angle $\theta_{out}$, order of diffraction m, wavelength λ of light, refractive index $n_{in}$ of a medium on the light inlet side and refractive index $n_{out}$ of a medium on the light exit side.

$$P \cdot (n_{in} \cdot \sin\theta_{in} - n_{out} \cdot \sin\theta_{out}) = m\lambda$$

The diffraction angle $\theta_{out}$ of the m th order diffraction light can be changed by changing the pitch P.

A phase function of the first order diffraction light can be represented by an even degree polynomial shown below.

$$\phi(r) = \sum_{i=1}^{N} \beta_{2i} r^{2i} \tag{3}$$

φ (r) represents a phase function, r represents distance from the central axis, ß represents coefficients, and N and i represent natural numbers. The unit of ß is determined such that the unit of $$\beta_{2i} r^{2i}$$

is radian.

An optical path difference function is represented as a product of λ/2Π and the phase function. An r derivative of the optical path difference function corresponds to diffraction angle. Thus, the following relationship holds.

$$\frac{\lambda}{2\pi} \cdot \frac{d\phi(r)}{dr} = \sin\theta_{in} - \sin\theta_{out}$$

Accordingly, an r derivative of the phase function is proportional to diffraction angle.

The shape of the diffraction grating will be described below. Assume that a ray travelling in the optical axis direction passes through the diffraction grating. Depth in the optical axis direction of the diffraction grating is represented by the following expression.

$$d(r) = \frac{\Delta\{\phi(r) - \eta(r)\}}{2\pi} \quad (4)$$

$\Delta$ in Expression (4) is represented by the following expression.

$$\Delta = \frac{\lambda}{(n-1)} \quad (5)$$

$\lambda$ represents the wavelength of light at which diffraction efficiency is maximized, and n represents refractive index of the diffraction grating at the wavelength. $\eta(r)$ represents a floor function represented by the following expression.

$$\eta(r) = \left\lfloor \frac{\phi}{2\pi} \right\rfloor \times 2\pi$$

The diffraction grating is provided on a lens surface, and d (r) is corrected according to a position on the lens surface and an angle of incidence of light onto the diffraction grating. A correcting factor for a position on the lens surface can be represented by the following expression using the tangential angle θ.

$$T(r) = \frac{1}{\cos\theta(r)} \quad (6)$$

The above-described angle of incidence of light means an angle of incidence of a ray travelling from the center of the light source onto the surface provided with the diffraction grating. FIG. 1 shows an angle of incidence of light Π(r) onto the surface S1 provided with the diffraction grating. The angle of incidence of light Π(r) is represented as a function of r by the following expression.

$$\Pi(r) = \gamma_1 r + \sum_{i=1}^{N} \gamma_{2i} r^{2i} \quad (7)$$

In Expression (7), γ represents coefficients, and N and i represent natural numbers.

A correcting factor I(r) for an angle of incidence of light Π(r) is represented by the following expression.

$$I(r) = \cos\frac{n_{in}}{n_{out}}\Pi(r) \quad (8)$$

In Expression (8), $n_{in}$ represents refractive index of a medium on the entry side, and $n_{out}$ represents refractive index of a medium on the exit side. The term $$\frac{n_{in}}{n_{out}}\Pi(r)$$

corresponds to the diffraction angle.

Depth in the optical axis direction D(r) of the diffraction grating is represented by the following expression, using Expressions (4), (6) and (8).

$$D(r)=T(r)\times I(r)\times d(r) \quad (9)$$

Figure 3:
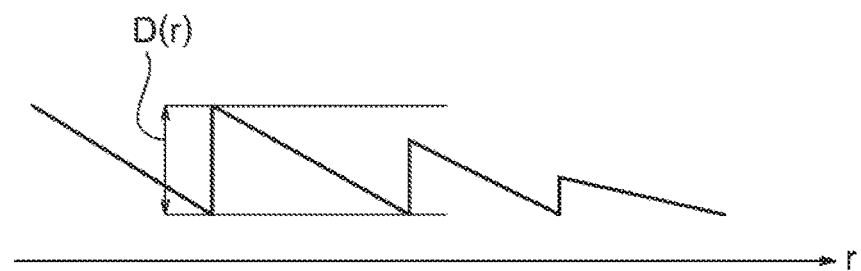
FIG. 3 is a conceptual diagram for illustrating depth in the optical axis direction D(r) of the diffraction grating.

FIG. 3 is a conceptual diagram for illustrating depth in the optical axis direction D(r) of the diffraction grating.

The absolute value of sag |Sag (r)| of the bottom of a groove of the diffraction grating is represented by the following expression, using Expressions (1) and (9).

$$|Sag(r)|=|S(r)|-D(r) \quad (10)$$

The achromatic feature of the diffraction grating will be described below. The Abbe number of the diffraction grating is −3.453.

In a single lens without a diffraction grating, spherical aberrations are determined by the spherical curvature of the lens. In an aberration diagram, curves representing spherical aberrations for respective values of wavelength show that spherical aberrations for respective values of wavelength change in similar ways according to the height of rays, that is, distance between rays parallel to the optical axis and the optical axis. Abbe numbers represent chromatic aberrations corresponding to differences in spherical aberrations for respective values of wavelength. Values of Abbe number of lenses are positive.

Accordingly, by appropriately combining a lens having positive values of Abbe number and a diffraction grating having negative values of Abbe number, the lens can be achromatized, that is, differences in spherical aberrations for respective values of wavelength can be reduced.

As described above, spherical aberrations are determined by the spherical curvature of a lens, and in an aberration diagram, curves representing spherical aberrations for respective values of wavelength show that spherical aberrations for respective values of wavelength change in similar ways according to the height of rays. In order to achromatize a lens with a diffraction grating, the second order term of r of a phase function, the term corresponding to the spherical curvature, is usually used. For example, longitudinal chromatic aberrations can be reduced using the second order term of r.

When the spherical curvature corresponding to the second order term of r of a phase function is great, however, differences in focal length between the designed first order diffraction light and diffraction lights besides the first order diffraction light are great, and magnifications of the diffraction lights besides the first order diffraction light change remarkably. Usually, in a diffraction grating, ratios of an amount of diffraction lights of orders different from the designed order to amount of the light of the designed order are several percent, and when magnifications of the diffraction lights besides the light of the designed order are different from that of the light of the designed order, glare and color breakup due to the diffraction lights besides the light of the designed order appear in such a way that they can be recognized clearly.

In the present invention, the second order coefficient $ß_2$ of r of the phase function is made relatively small. More specifically, $ß_2$ and $ß_4$ are determined such that the following relationship is satisfied, where R represents effective radius of the lens.

$$|\beta_2|\cdot(0.3R)^2 < |\beta_4|\cdot(0.3R)^4 \quad (11)$$

Signs of $ß_4$, $ß_6$ and $ß_8$ preferably include at least one plus sign and at least one minus sign. Further, it is preferable that the sign of $ß_4$ is identical with that of $ß_8$ and different from that of $ß_6$.

Further, the following relationship should preferably be satisfied.

$$0 < \frac{\beta_6^2}{\beta_4 \beta_8} < 5 \qquad (12)$$

In a projection lens for headlamp, correction of chromatic aberrations at a height close to that of the principal ray is not so important, and correction of chromatic aberrations against color breakup generated at the boundary between an illuminated area and an unilluminated area, that is, correction of chromatic aberrations at a position that is away from the principal ray is important. Accordingly, even when the second order term of r of the phase function, the term corresponding to the spherical curvature, is made relatively small, correction of chromatic aberrations against color breakup generated at the boundary between an illuminated area and an unilluminated area can be carried out to a sufficient extent.

As described above, a first derivative of a phase function $$\frac{d\phi(r)}{dr}$$

is proportional to diffraction angle. Accordingly, a second derivative of a phase function $$\frac{d^2\phi(r)}{dr^2}$$

Corresponds to a change of the diffraction angle.

At an extreme value or a point of inflection of a second derivative of a phase function, the diffraction angle changes remarkably. In fact, positions, that is, values of r of distinctive points of a curve representing spherical aberration in an aberration diagram substantially agree with values of r of extreme values or values of r of points of inflection of the second derivative of the phase function. More specifically, in the vicinity of r corresponding to an extreme value of a second derivative of the phase function, extreme values of spherical aberration for respective values of wavelength appear, and in the vicinity of r corresponding to a point of inflection of the second derivative of the phase function, the absolute values of spherical aberration for respective values of wavelength are relatively small.

Accordingly, in order to effectively carry out correction of chromatic aberrations at a position that is away from the principal ray, a phase function should preferably be determined such that the second diffractive of r of the phase function has at least one extreme value and at least one point of inflection in the range where r is greater than 30% or 50% of the effective radius R.

Further, the phase function should preferably be determined such that a difference in spherical aberration between the maximum value and the minimum value at any value of r in $$0 \le r \le R$$

is equal to or less than the longitudinal chromatic aberration, that is, the difference in spherical aberration between the maximum value and the minimum value at r=0 for any value of wavelength of visible light.

Further, the lens without a diffraction grating should be designed such that the longitudinal chromatic aberration is preferably 2 millimeters or less and more preferably 1.2 millimeters or less.

The examples of the present invention will be described below. The lenses of the examples are biconvex lenses. The lens thickness along the central axis is 33.0 millimeters, the lens diameter is 64 millimeters (the effective radius is 32 millimeters), and the refractive index of the lenses is 1.4973.

Example 1

The lens of Example 1 is provided with a diffraction grating at the surface S1.

The surfaces S1 and S2 are represented by the following even function for an aspheric surface.

$$S(r) = \frac{cr^2}{1 + \sqrt{1 - (1+k)c^2 r^2}} + \sum_{i=1}^{N} \alpha_{2i} r^{2i} \qquad (1)$$

Table 1 shows values of constants and coefficients of Expression (1).

TABLE 1

| | S1 (with diffraction grating) | S2 |
|---|---|---|
| c | 2.60330E−02 | −4.84012E−03 |
| k | −1.00000E+00 | 0.00000E+00 |
| $\alpha_2$ | 0.00000E+00 | 0.00000E+00 |
| $\alpha_4$ | −2.05183E−06 | 9.75242E−07 |
| $\alpha_6$ | 3.38505E−09 | 0.00000E+00 |
| $\alpha_8$ | −9.42564E−13 | 0.00000E+00 |
| $\alpha_{10}$ | 0.00000E+00 | 0.00000E+00 |

The phase function of the diffraction grating on the surface S1 is represented by the following even degree polynomial of r.

$$\phi(r) = \sum_{i=1}^{N} \beta_{2i} r^{2i} \qquad (3)$$

Table 2 shows values of coefficients of Expression (3) and values of Expression (5).

TABLE 2

| | |
|---|---|
| λ | 492.3 nm |
| n | 1.4973 |
| Δ | 989.92 nm |
| $\beta_2$ | 0.00000E+00 |
| $\beta_4$ | −1.80613E−02 |
| $\beta_6$ | 2.01057E−05 |
| $\beta_8$ | −7.26942E−09 |
| $\beta_{10}$ | 0.00000E+00 |

According to Table 2, $ß_2$ is 0, and the following relationship is satisfied.

$$|\beta_2|\cdot(0.3R)^2 < |\beta_4|\cdot(0.3R)^4 \qquad (11)$$

Further, from Table 2, the following value can be calculated.

$$\frac{\beta_6^2}{\beta_4\beta_8} = 3.07886$$

Accordingly, the following relationship is satisfied.

$$0 < \frac{\beta_6^2}{\beta_4\beta_8} < 5 \quad (12)$$

The angle of incidence of light $\Pi(r)$ onto the surface S1 is represented as a function of r by the following expression.

$$\Pi(r) = \gamma_1 r + \sum_{i=1}^{N} \gamma_{2i} r^{2i} \quad (7)$$

Table 3 shows values of coefficients of Expression (7).

TABLE 3

| | |
|---|---|
| $Y_1$ | 1.15528434 |
| $Y_2$ | −0.015836148 |
| $Y_4$ | 7.57675E−06 |
| $Y_6$ | 1.38968E−08 |
| $Y_8$ | −1.32952E−11 |

Figure 4:
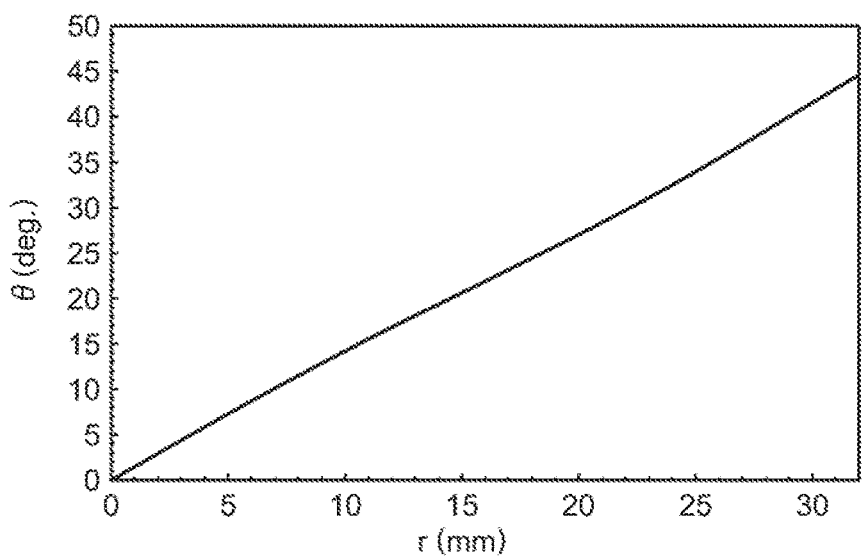
FIG. 4 shows a relationship between r and tangential angle θ on the surface S1 provided with the diffraction grating of the lens of Example 1.

FIG. 4 shows a relationship between r and tangential angle θ on the surface S1 provided with the diffraction grating of the lens of Example 1. The horizontal axis of FIG. 4 indicates distance r from the optical axis, and the unit is millimeter. The vertical axis of FIG. 4 indicates tangential angle θ represented by Expression (2), and the unit is degree.

Figure 5:
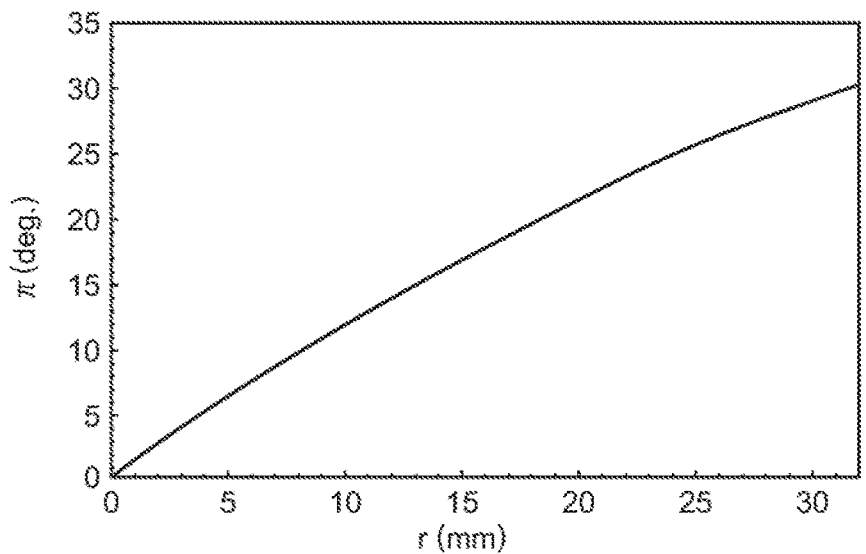
FIG. 5 shows a relationship between r and angle of incidence of light Π(r) onto the surface S1 provided with the diffraction grating of the lens of Example 1.

FIG. 5 shows a relationship between r and angle of incidence of light $\Pi(r)$ onto the surface S1 provided with the diffraction grating of the lens of Example 1. The horizontal axis of FIG. 5 indicates distance r from the optical axis, and the unit is millimeter. The vertical axis of FIG. 5 indicates angle of incidence of light $\Pi(r)$ represented by Expression (7), and the unit is degree.

Figure 6:
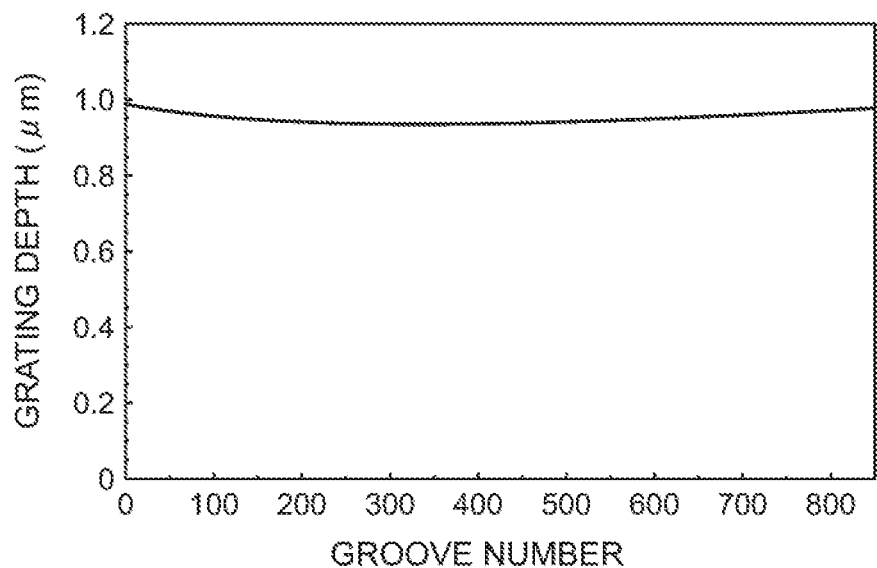
FIG. 6 shows a relationship between groove number and grating depth corresponding to each groove (depth of groove) in the diffraction grating of the lens of Example 1.

FIG. 6 shows a relationship between groove number and grating depth of each groove (depth of groove) in the diffraction grating of the lens of Example 1. The groove numbers are assigned in order from the optical axis to the periphery of the lens. The horizontal axis of FIG. 6 indicates groove number. The vertical axis of FIG. 6 indicates grating depth of each groove, and the unit is micrometer.

Figure 7:
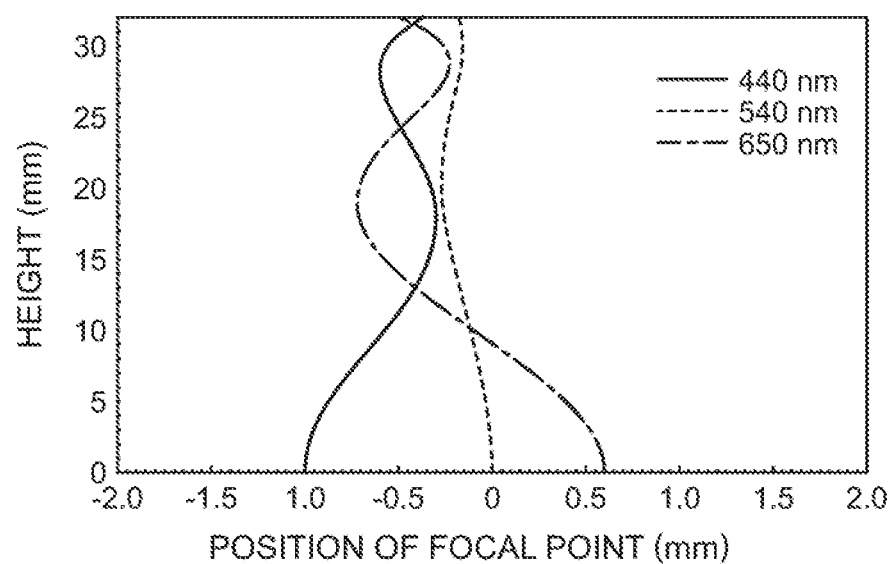
FIG. 7 shows spherical aberration of the lens provided with the diffraction grating of Example 1.

FIG. 7 shows spherical aberration of the lens provided with the diffraction grating of Example 1. The horizontal axis of FIG. 7 indicates position of focal point along the optical axis, and the unit is millimeter. The vertical axis of FIG. 7 indicates height of incident rays parallel to the optical axis with respect to the optical axis, and the unit is millimeter. According to FIG. 7, the longitudinal chromatic aberration is 1.7 millimeters. In the whole range of height of rays, a distance in spherical aberration between the maximum value and the minimum value is equal to or less than the value of the longitudinal chromatic aberration. The effective radius R is 32 millimeters, and in the range of $r/R \geq 0.3$ of the vertical axis, a distance in spherical aberration between the maximum value and the minimum value for each wavelength is equal to or less than 30% of the value of the longitudinal chromatic aberration.

Figure 8:
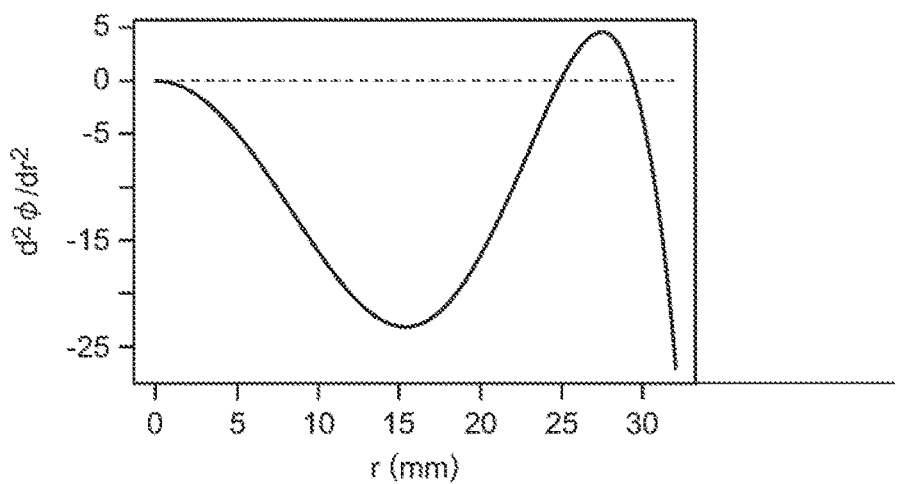
FIG. 8 shows second derivative of the phase function represented using r of Example 1.

FIG. 8 shows second derivative of the phase function represented using r of Example 1. The horizontal axis of FIG. 8 indicates r, and the unit is millimeter. The vertical axis of FIG. 8 indicates second derivative.

Figure 9:
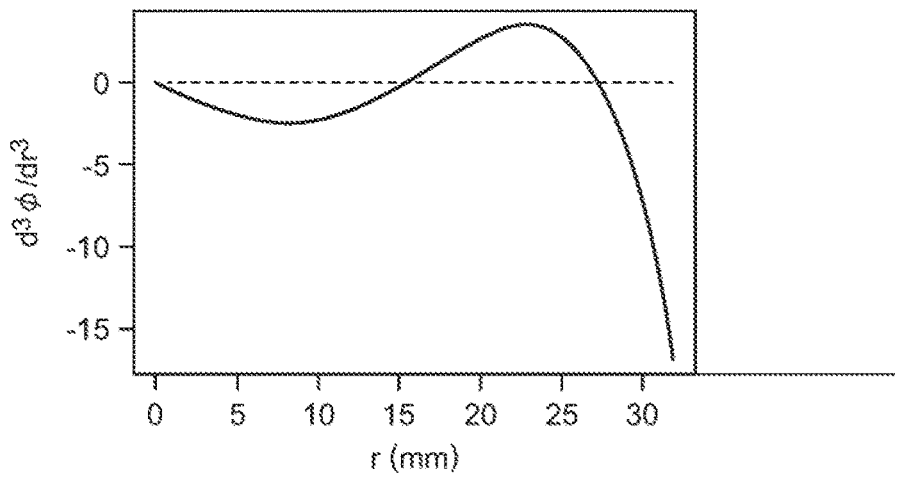
FIG. 9 shows third derivative of the phase function represented using r of Example 1.

FIG. 9 shows third derivative of the phase function represented using r of Example 1. The horizontal axis of FIG. 9 indicates r, and the unit is millimeter. The vertical axis of FIG. 9 indicates third derivative.

Figure 10:
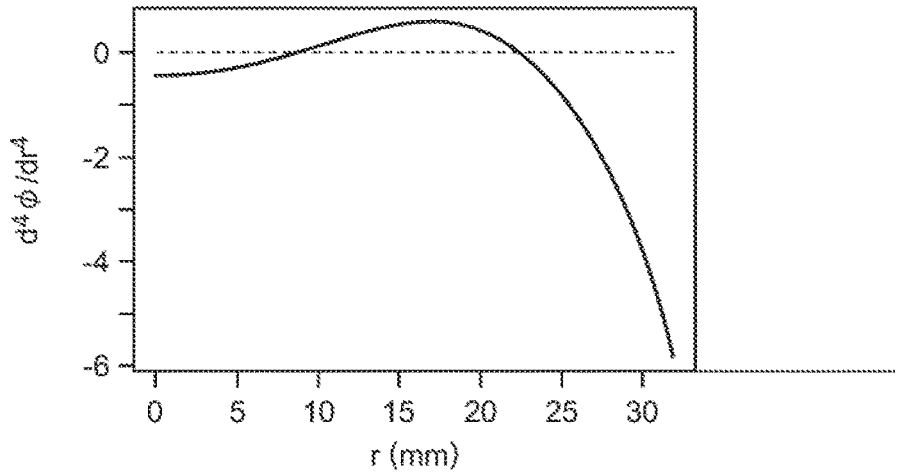
FIG. 10 shows fourth derivative of r of the phase function of Example 1.

FIG. 10 shows fourth derivative of the phase function represented using r of Example 1. The horizontal axis of FIG. 10 indicates r, and the unit is millimeter. The vertical axis of FIG. 10 indicates fourth derivative.

According to FIGS. 8-10, second derivative of the phase function represented using r has extreme values at r=15 and r=27, and has points of inflection at r=8 and r=22. The effective radius R is 32 millimeters, and second derivative of the phase function represented using r has two extreme values and one point of inflection in the range of $r/R \geq 0.3$ , and has one extreme value and one point of inflection in the range of $r/R \geq 0.5$ Example 2

The lens of Example 2 is provided with a diffraction grating at the surface S2.

The surfaces S1 and S2 are represented by the following even function for an aspheric surface.

$$S(r) = \frac{cr^2}{1 + \sqrt{1 - (1+k)c^2 r^2}} + \sum_{i=1}^{N} \alpha_{2i} r^{2i} \quad (1)$$

Table 4 shows values of constants and coefficients of Expression (1).

TABLE 4

| | S1 | S2 (with diffraction grating) |
|---|---|---|
| c | 3.08729E−02 | −5.51711E−03 |
| k | −1.05001E+00 | 1.03188E+00 |
| $\alpha_2$ | 0.00000E+00 | 0.00000E+00 |
| $\alpha_4$ | 2.41612E−06 | 3.20000E−06 |
| $\alpha_6$ | 4.05612E−11 | −1.66000E−09 |
| $\alpha_8$ | 0.00000E+00 | 0.00000E+00 |
| $\alpha_{10}$ | 0.00000E+00 | 0.00000E+00 |

The phase function of the diffraction grating on the surface S2 is represented by the following even degree polynomial of r.

$$\phi(r) = \sum_{i=1}^{N} \beta_{2i} r^{2i} \quad (3)$$

Table 5 shows values of coefficients of Expression (3) and values of Expression (5).

TABLE 5

| | |
|---|---|
| λ | 492.3 nm |
| n | 1.4973 |
| Δ | 989.92 nm |
| $β_2$ | 0.00000E+00 |
| $β_4$ | −2.44001E−02 |
| $β_6$ | 5.03007E−05 |
| $β_8$ | −5.17006E−08 |
| $β_{10}$ | 2.13000E−11 |

According to Table 5, $β_2$ is 0, and the following relationship is satisfied.

$$|β_2|·(0.3R)^2 < |β_4|·(0.3R)^4 \quad (11)$$

Further, from Table 5, the following value can be calculated.

$$\frac{β_6^2}{β_4 β_8} = 2.00568$$

Accordingly, the following relationship is satisfied.

$$0 < \frac{β_6^2}{β_4 β_8} < 5 \quad (12)$$

The angle of incidence of light Π(r) onto the surface S2 is represented as a function of r by the following expression.

$$Π(r) = γ_1 r + \sum_{i=1}^{N} γ_{2i} r^{2i} \quad (7)$$

Table 6 shows values of coefficients of Expression (7).

TABLE 6

| | |
|---|---|
| $Y_1$ | 1.208888165 |
| $Y_2$ | 0.002086964 |
| $Y_4$ | −8.94647E−06 |
| $Y_6$ | −3.83905E−09 |
| $Y_8$ | 1.02306E−11 |

Figure 11:
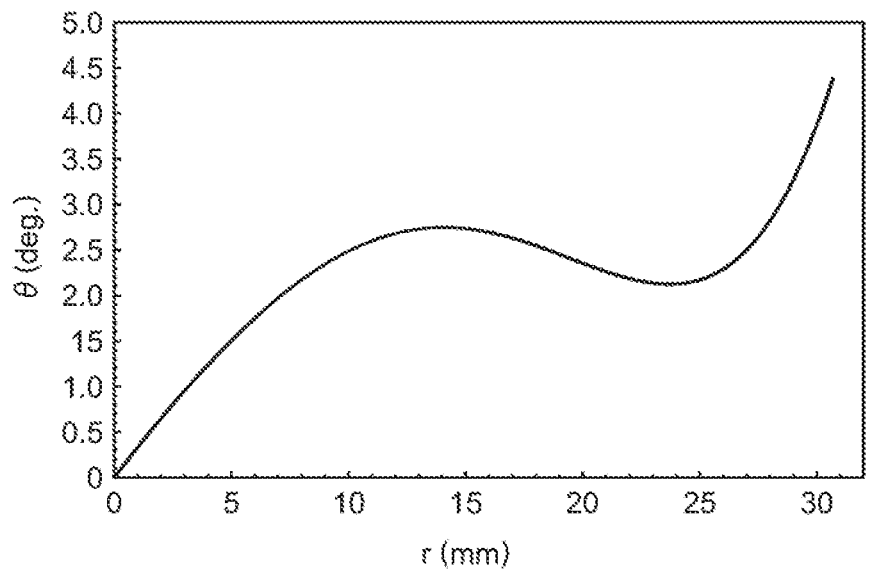
FIG. 11 shows a relationship between r and tangential angle θ on the surface S2 provided with the diffraction grating of the lens of Example 2.

FIG. 11 shows a relationship between r and tangential angle θ on the surface S2 provided with the diffraction grating of the lens of Example 2. The horizontal axis of FIG. 11 indicates distance r from the optical axis, and the unit is millimeter. The vertical axis of FIG. 11 indicates tangential angle θ represented by Expression (2), and the unit is degree.

Figure 12:
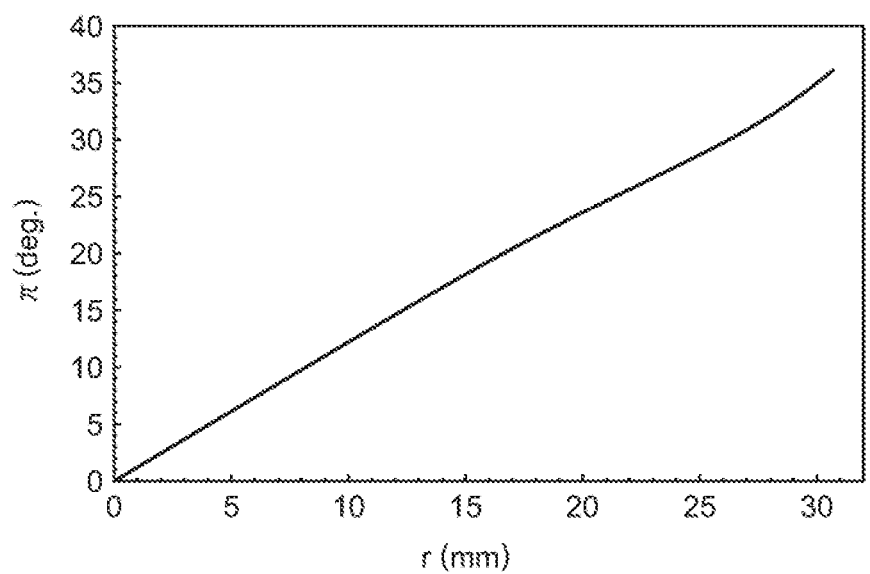
FIG. 12 shows a relationship between r and angle of incidence of light MO onto the surface S2 provided with the diffraction grating of the lens of Example 2.

FIG. 12 shows a relationship between r and angle of incidence of light Π(r) onto the surface S2 provided with the diffraction grating of the lens of Example 2. The horizontal axis of FIG. 12 indicates distance r from the optical axis, and the unit is millimeter. The vertical axis of FIG. 12 indicates angle of incidence of light Π(r) represented by Expression (7), and the unit is degree.

Figure 13:
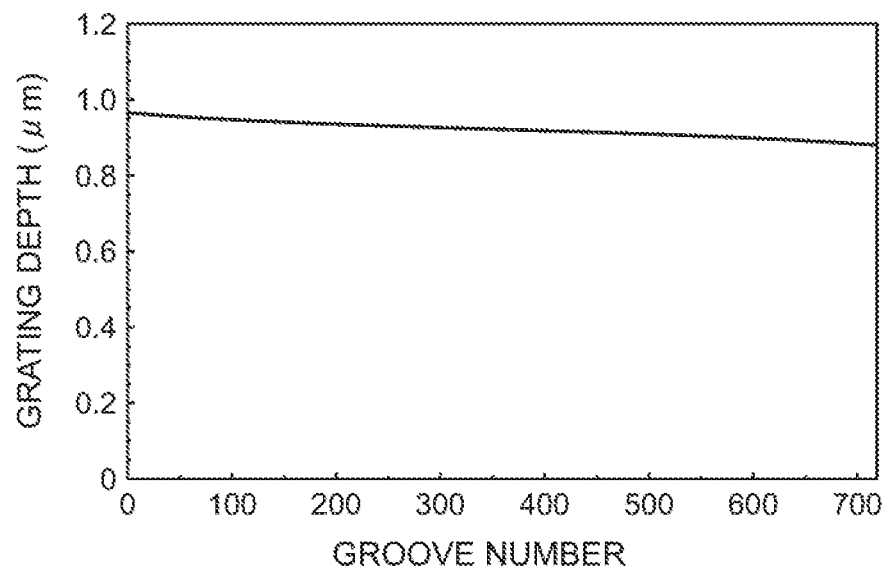
FIG. 13 shows a relationship between groove number and grating depth corresponding to each groove (depth of groove) in the diffraction grating of the lens of Example 2.

FIG. 13 shows a relationship between groove number and grating depth of each groove (depth of groove) in the diffraction grating of the lens of Example 2. The groove numbers are assigned in order from the optical axis to the periphery of the lens. The horizontal axis of FIG. 13 indicates groove number. The vertical axis of FIG. 13 indicates grating depth of each groove, and the unit is micrometer.

Figure 14:
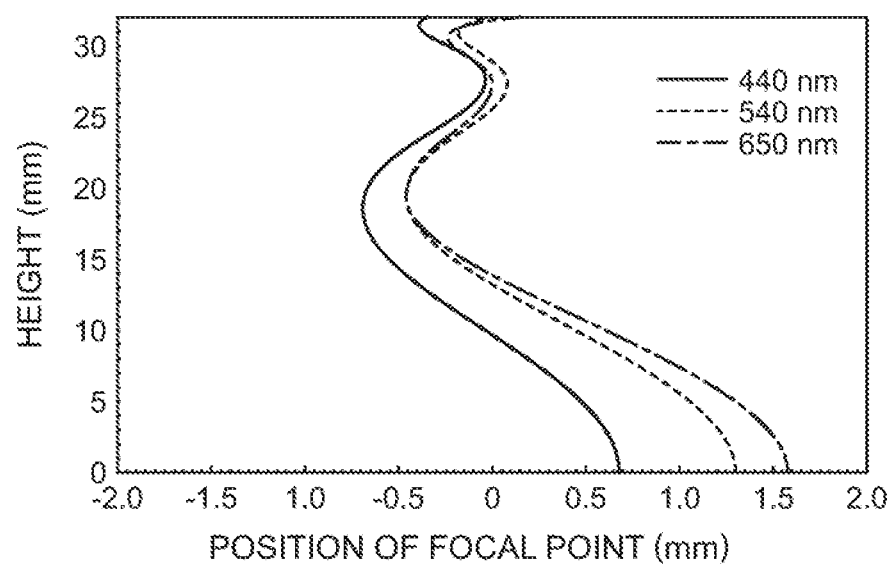
FIG. 14 shows spherical aberration of the lens provided with the diffraction grating of Example 2.

FIG. 14 shows spherical aberration of the lens provided with the diffraction grating of Example 2. The horizontal axis of FIG. 14 indicates position of focal point along the optical axis, and the unit is millimeter. The vertical axis of FIG. 14 indicates height of incident rays parallel to the optical axis with respect to the optical axis, and the unit is millimeter. According to FIG. 14, the longitudinal chromatic aberration is 0.9 millimeters. In the whole range of height of rays, a distance in spherical aberration between the maximum value and the minimum value is equal to or less than the value of the longitudinal chromatic aberration. The effective radius R is 32 millimeters, and in the range of $$r/R ≥ 0.3$$

of the vertical axis, a distance in spherical aberration between the maximum value and the minimum value for each wavelength is equal to or less than 70% of the value of the longitudinal chromatic aberration.

Figure 15:
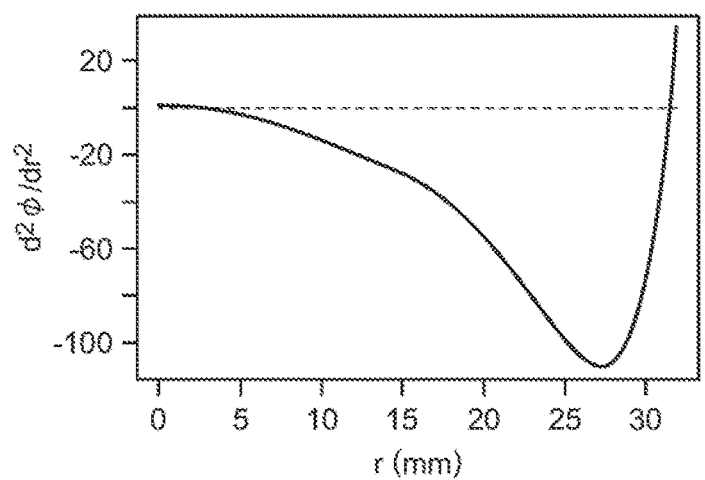
FIG. 15 shows second derivative of the phase function represented using r of Example 2.

FIG. 15 shows second derivative of the phase function represented using r of Example 2. The horizontal axis of FIG. 15 indicates r, and the unit is millimeter. The vertical axis of FIG. 15 indicates second derivative.

Figure 16:
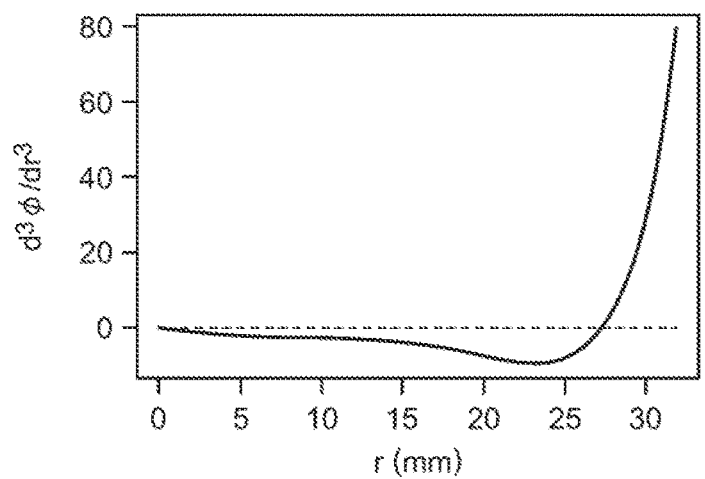
FIG. 16 shows third derivative of the phase function represented using r of Example 2.

FIG. 16 shows third derivative of the phase function represented using r of Example 2. The horizontal axis of FIG. 16 indicates r, and the unit is millimeter. The vertical axis of FIG. 16 indicates third derivative.

Figure 17:
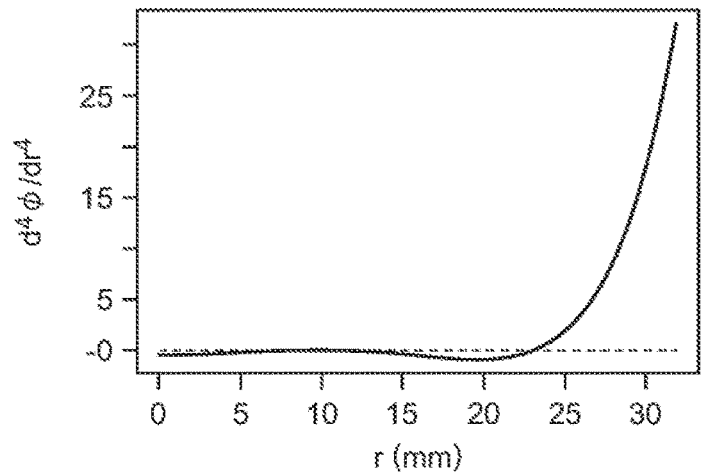
FIG. 17 shows fourth derivative of r of the phase function of Example 2.

FIG. 17 shows fourth derivative of the phase function represented using r of Example 2. The horizontal axis of FIG. 17 indicates r, and the unit is millimeter. The vertical axis of FIG. 17 indicates fourth derivative.

According to FIGS. 15-17, second derivative of the phase function represented using r has extreme values at r=27, and has points of inflection at r=11 and r=23. The effective radius R is 32 millimeters, and second derivative of the phase function represented using r has one extreme value and two points of inflection in the range of $$r/R ≥ 0.3$$

, and has one extreme value and one point of inflection in the range of $$r/R ≥ 0.5$$

Example 3

The lens of Example 3 is provided with a diffraction grating at the surface S1.

The surfaces S1 and S2 are represented by the following even function for an aspheric surface.

$$S(r) = \frac{cr^2}{1 + \sqrt{1 - (1+k)c^2 r^2}} + \sum_{i=1}^{N} α_{2i} r^{2i} \quad (1)$$

Table 7 shows values of constants and coefficients of Expression (1).

TABLE 7

| | S1 (with diffraction grating) | S2 |
|---|---|---|
| c | 3.31362E−02 | −2.27662E−03 |
| k | −1.00000E+00 | 0.00000E+00 |
| $α_2$ | 0.00000E+00 | 0.00000E+00 |
| $α_4$ | −2.76448E−06 | 0.00000E+00 |

TABLE 7-continued

| | S1(with diffraction grating) | S2 |
|---|---|---|
| $\alpha_6$ | 9.54570E−09 | 0.00000E+00 |
| $\alpha_8$ | −9.19235E−12 | 0.00000E+00 |
| $\alpha_{10}$ | 3.26366E−15 | 0.00000E+00 |

The phase function of the diffraction grating on the surface S1 is represented by the following even degree polynomial of r.

$$\phi(r) = \sum_{i=1}^{N} \beta_{2i} r^{2i} \quad (3)$$

Table 8 shows values of coefficients of Expression (3) and values of Expression (5).

TABLE 8

| | |
|---|---|
| λ | 492.3 nm |
| n | 1.4973 |
| Δ | 989.92 nm |
| $\beta_2$ | 0.00000E+00 |
| $\beta_4$ | −2.36108E−02 |
| $\beta_6$ | 4.45979E−05 |
| $\beta_8$ | −4.13122E−08 |
| $\beta_{10}$ | 1.41398E−11 |

According to Table 8, $\beta_2$ is 0, and the following relationship is satisfied.

$$|\beta_2|\cdot(0.3R)^2 < |\beta_4|\cdot(0.3R)^4 \quad (11)$$

Further, from Table 2, the following value can be calculated.

$$\frac{\beta_6^2}{\beta_4 \beta_8} = 2.03911$$

Accordingly, the following relationship is satisfied.

$$0 < \frac{\beta_6^2}{\beta_4 \beta_8} < 5 \quad (12)$$

The angle of incidence of light Π(r) onto the surface S1 is represented as a function of r by the following expression.

$$\Pi(r) = \gamma_1 r + \sum_{i=1}^{N} \gamma_{2i} r^{2i} \quad (7)$$

Table 9 shows values of coefficients of Expression (7).

TABLE 9

| | |
|---|---|
| $\gamma_1$ | 1.34210E+00 |
| $\gamma_2$ | −1.93586E−02 |
| $\gamma_4$ | 2.62334E−05 |
| $\gamma_6$ | −3.49328E−08 |
| $\gamma_8$ | 1.55802E−11 |

Figure 18:
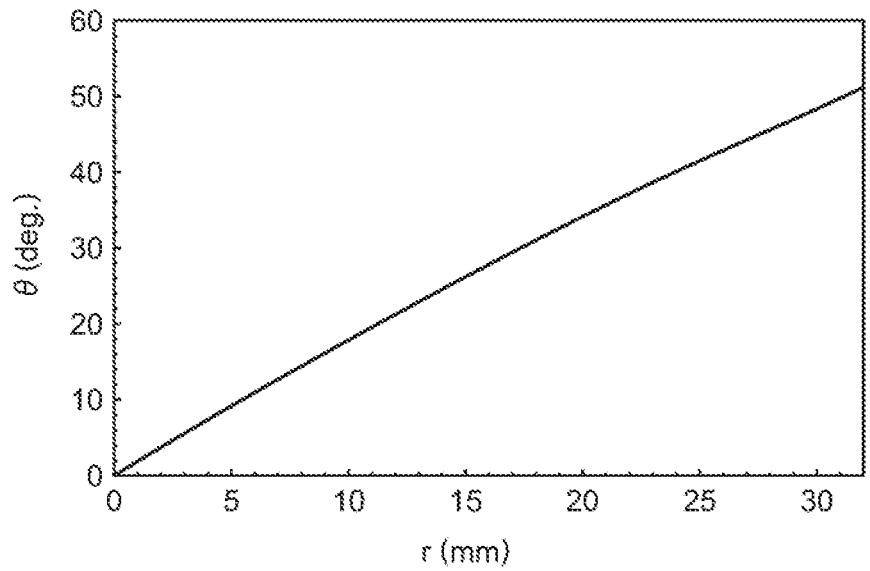
FIG. 18 shows a relationship between r and tangential angle θ on the surface S2 provided with the diffraction grating of the lens of Example 3.

FIG. 18 shows a relationship between r and tangential angle θ on the surface S1 provided with the diffraction grating of the lens of Example 3. The horizontal axis of FIG. 18 indicates distance r from the optical axis, and the unit is millimeter. The vertical axis of FIG. 18 indicates tangential angle θ represented by Expression (2), and the unit is degree.

Figure 19:
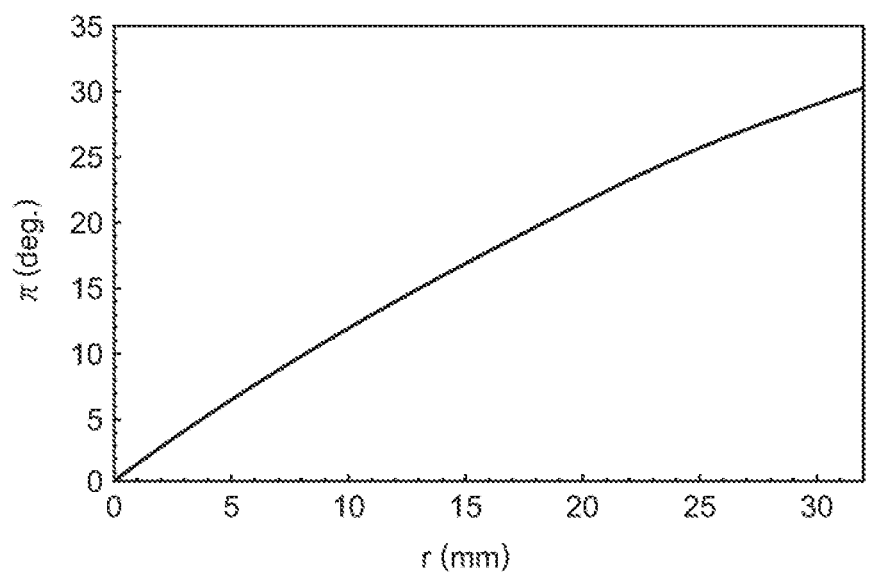
FIG. 19 shows a relationship between r and angle of incidence of light MO onto the surface S1 provided with the diffraction grating of the lens of Example 3.

FIG. 19 shows a relationship between r and angle of incidence of light Π(r) onto the surface S1 provided with the diffraction grating of the lens of Example 3. The horizontal axis of FIG. 19 indicates distance r from the optical axis, and the unit is millimeter. The vertical axis of FIG. 19 indicates angle of incidence of light Π(r) represented by Expression (7), and the unit is degree.

Figure 20:
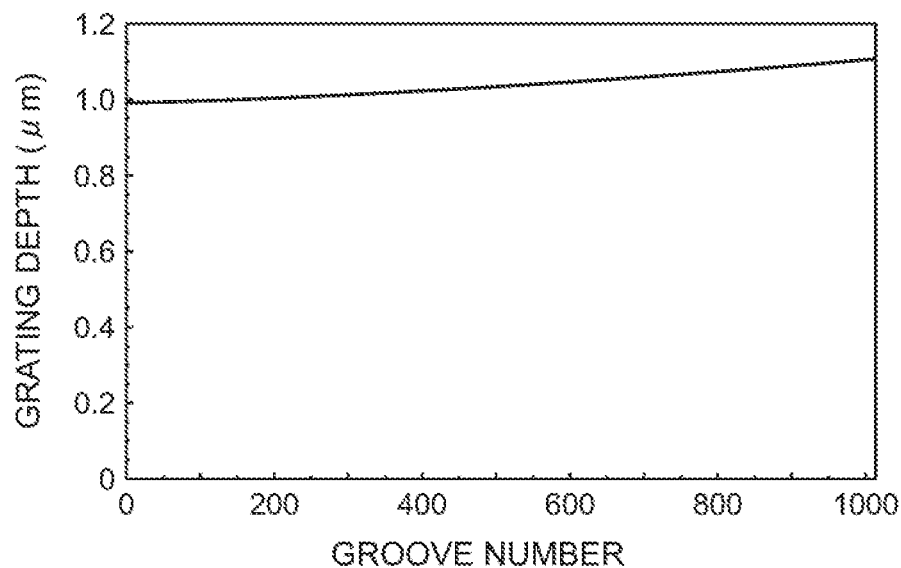
FIG. 20 shows a relationship between groove number and grating depth corresponding to each groove (depth of groove) in the diffraction grating of the lens of Example 3.

FIG. 20 shows a relationship between groove number and grating depth of each groove (depth of groove) in the diffraction grating of the lens of Example 3. The groove numbers are assigned in order from the optical axis to the periphery of the lens. The horizontal axis of FIG. 20 indicates groove number. The vertical axis of FIG. 20 indicates grating depth of each groove, and the unit is micrometer.

Figure 21:
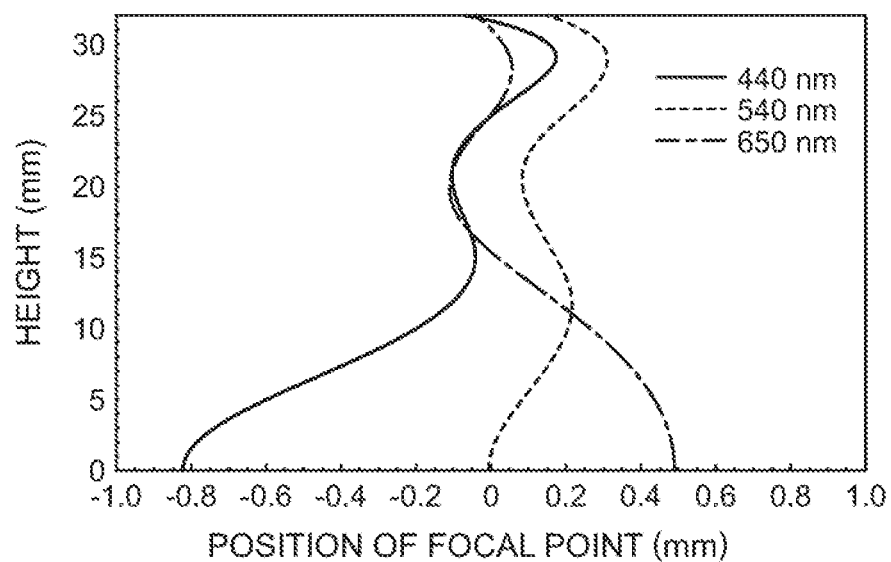
FIG. 21 shows spherical aberration of the lens provided with the diffraction grating of Example 3.

FIG. 21 shows spherical aberration of the lens provided with the diffraction grating of Example 3. The horizontal axis of FIG. 21 indicates position of focal point along the optical axis, and the unit is millimeter. The vertical axis of FIG. 21 indicates height of incident rays parallel to the optical axis with respect to the optical axis, and the unit is millimeter. According to FIG. 21, the longitudinal chromatic aberration is 1.3 millimeters. In the whole range of height of rays, a distance in spherical aberration between the maximum value and the minimum value is equal to or less than the value of the longitudinal chromatic aberration. The effective radius R is 32 millimeters, and in the range of $$r/R \geq 0.3$$

of the vertical axis, a distance in spherical aberration between the maximum value and the minimum value for each wavelength is equal to or less than 30% of the value of the longitudinal chromatic aberration.

Figure 22:
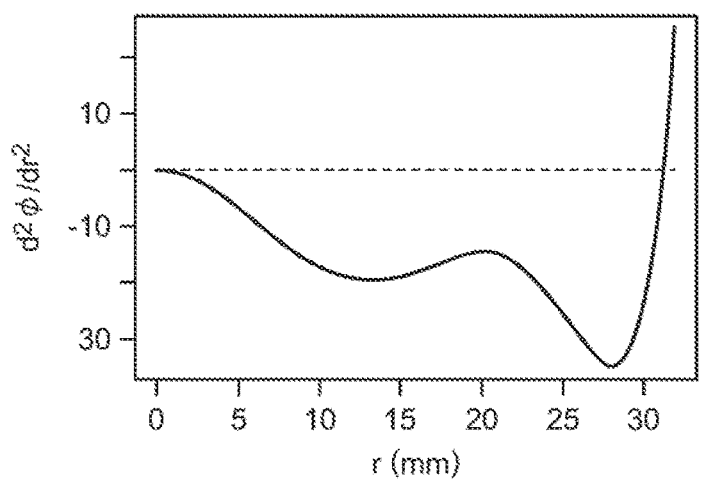
FIG. 22 shows second derivative of the phase function represented using r of Example 3.

FIG. 22 shows second derivative of the phase function represented using r of Example 3. The horizontal axis of FIG. 15 indicates r, and the unit is millimeter. The vertical axis of FIG. 15 indicates second derivative.

Figure 23:
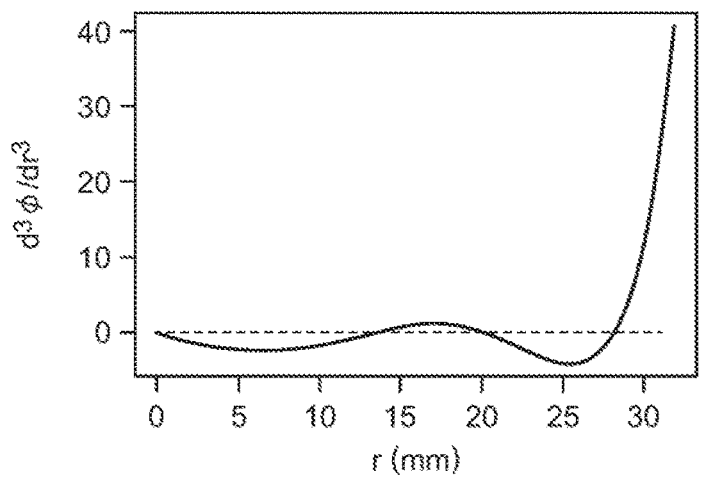
FIG. 23 shows third derivative of the phase function represented using r of Example 3.

FIG. 23 shows third derivative of the phase function represented using r of Example 3. The horizontal axis of FIG. 23 indicates r, and the unit is millimeter. The vertical axis of FIG. 23 indicates third derivative.

Figure 24:
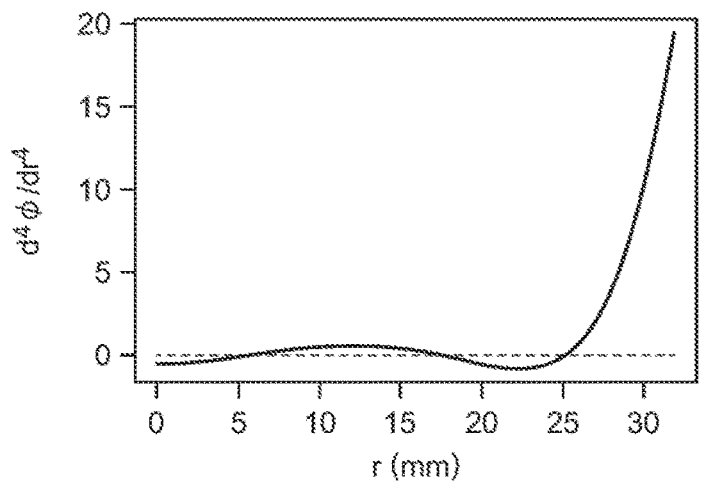
FIG. 24 shows fourth derivative of r of the phase function of Example 3.

FIG. 24 shows fourth derivative of the phase function represented using r of Example 3. The horizontal axis of FIG. 24 indicates r, and the unit is millimeter. The vertical axis of FIG. 24 indicates fourth derivative.

According to FIGS. 22-24, second derivative of the phase function represented using r has extreme values at r=14, r=20 and r=28, and has points of inflection at r=7, r=18 and r=25. The effective radius R is 32 millimeters, and second derivative of the phase function represented using r has three extreme values and two points of inflection in the range of $$r/R \geq 0.3,$$

and has two extreme values and two points of inflection in the range of $$r/R \geq 0.5.$$

Shapes of Lenses of Examples 1-3
Table 10 shows shapes of lenses of Examples 1-3.

TABLE 10

| Example | Focal length | Curvature light source side | Curvature Opposite side from light source | Curvature ratio | Effective diameter | F | NA |
|---|---|---|---|---|---|---|---|
| 1 | 67.879 | −0.00484 | 0.02603 | 5.37859 | 64 | 1.060609375 | 0.471427098 |
| 2 | 58.129 | −0.00552 | 0.03087 | 5.59584 | 64 | 0.908265625 | 0.550499751 |
| 3 | 58.788 | −0.00228 | 0.03314 | 14.55502 | 64 | 0.9185625 | 0.544328775 |

The unit of focal length is millimeter. In Table 10, curvature means a value of c in Expression (1). The unit of curvature is inverse millimeter (mm$^{-1}$). Curvature ratio means the ratio of the curvature of the lens surface on the side opposite from the light source to the curvature of the lens surface on the light source side. F represents f-number, and NA represents numerical aperture. As described above, the refractive index of the material of lenses of the examples is 1.4973. In general, effective diameter of lenses for headlamps of vehicles ranges from 40 to 100 millimeters.

Features of the Diffraction Grating of the Lenses of Examples 1-3

Table 11 shows features of the diffraction gratings of the lenses of Examples 1-3. The phase functions of the diffraction gratings are represented by Expression (3), and the coefficients of Expression (3) are shown in Tables 2, 5 and 8.

TABLE 11

| Example | Effective radius of lens [mm] | Phase | Number of annular grooves | Average pitch of diffraction grating [um] | Density of diffraction grating [Line/mm$^2$] | φ(R)/R$^2$ |
|---|---|---|---|---|---|---|
| 1 | 32 | 5343.126535 | 850.3849996 | 37.63001466 | 0.26434175 | 5.217897007 |
| 2 | 32 | 4439.136738 | 706.510555 | 45.29302468 | 0.219618452 | 4.335094471 |
| 3 | 32 | 6374.332494 | 1014.506525 | 31.54242895 | 0.315358844 | 6.224934077 |

In Table 11, phase means the maximum phase difference generated by the diffraction grating. The maximum phase difference corresponds to the value φ(R) obtained by substituting the effective radius R into the phase function. The number of annular grooves is obtained by dividing the absolute value of the maximum phase difference by 2π and represented by the following expression.

$$\left|\frac{\phi(R)}{2\pi}\right|$$

The average pitch of the diffraction grating is obtained by dividing the effective radius R by the number of annular grooves of the diffraction grating. The density of diffraction grating is obtained by dividing the number of annular grooves by the surface area of the lens and represented by the following expression.

$$\left|\frac{\phi(R)}{2\pi^2 R^2}\right|$$

By removing constants from the expression described above, the following expression can be obtained.

$$\left|\frac{\phi(R)}{R^2}\right|$$

The value of the above-described expression is proportional to the density of diffraction.

In consideration of losses caused by light absorption of the diffraction grating and limitations of machining, the pitch of the diffraction grating should preferably be 20 micrometers or greater. On the other hand, in order to correct chronical aberrations in a lens with a high NA (numerical aperture), a smaller pitch of the diffraction grating is preferable, and the pitch should preferably be less than 100 micrometers.

Since the effective diameter of lenses for headlamps of vehicles ranges from 40 to 100 millimeters, the number of annular grooves is in the range described below.

$$200 < \left|\frac{\phi(R)}{2\pi}\right| < 2500$$

In consideration of a good balance between difficulties in machining and optical performance, the number of annular grooves should preferably be in the range described below.

$$700 < \left|\frac{\phi(R)}{2\pi}\right| < 1100$$

When the amount corresponding to the density of diffraction grating $$\left|\frac{\phi(R)}{R^2}\right|$$

satisfies the following relationship, a lens with which chronical aberrations can be corrected to a sufficient degree and a high intensity of light can be obtained in an optical system in which the lens is combined with a light source can be obtained.

$$1 < \left|\frac{\phi(R)}{R^2}\right| < 10$$

When the amount corresponding to the density of diffraction grating $$\left|\frac{\phi(R)}{R^2}\right|$$

further satisfies the following relationship, a lens which has a higher efficiency and a greater pitch of the diffraction grating and is easy to machine can be obtained.

$$1 < \left|\frac{\phi(R)}{R^2}\right| < 7.5$$

What is claimed:

1. A lens for headlamps of vehicles provided with a diffraction grating on a surface,
   wherein a phase function of the diffraction grating is represented by $$\phi(r) = \sum_{i=1}^{N} \beta_{2i} r^{2i}$$

where r represents distance from the central axis of the lens, $\beta$ represents coefficients, and N and i represent natural numbers, and the relationship $|\beta_2|\cdot(0.3R)^2 < |\beta_4|\cdot(0.3R)^4$ is satisfied where R represents effective radius of the lens, and
   wherein a second derivative of the phase function represented using r has at least one extreme value and at least one point of inflection in the range of r where r is greater than 30% of the effective radius of the lens, a difference in spherical aberration between the maximum value and the minimum value for any value of wavelength of visible light at any value of r in the range $0 \leq r \leq R$ is equal to or less than the longitudinal chromatic aberration for any value of wavelength of visible light, the diffraction grating is at least partially on the surface in the range of r where r is greater than 30%, and the relationship $$1 < \left|\frac{\phi(R)}{R^2}\right| < 10$$

is satisfied.

2. A lens for headlamps of vehicles according to claim 1 wherein a second derivative of the phase function represented using r has at least one extreme value and at least one point of inflection in the range of r where r is greater than 50% of the effective radius of the lens, and the diffraction grating is at least partially on the surface in the range of r where r is greater than 50%.

3. A lens for headlamps of vehicles according to claim 1 wherein the relationship $$0 < \frac{\beta_6^2}{\beta_4 \beta_8} < 5$$

is satisfied.

4. A lens for headlamps of vehicles according to claim 1 wherein $\beta_4$ and $\beta_8$ are negative and $\beta_6$ is positive.

5. A lens for headlamps of vehicles according to claim 1 wherein depth of the diffraction grating is corrected depending on r.

6. A lens for headlamps of vehicles according to claim 1 wherein the relationship $$1 < \left|\frac{\phi(R)}{R^2}\right| < 7.5$$

is further satisfied.

7. A lens for headlamps of vehicles according to claim 1 wherein the both side surfaces are convex.

8. A lens for headlamps of vehicles according to claim 1 wherein effective diameter of the lens ranges from 40 millimeters to 100 millimeters.

9. A method of use of a lens provided with a diffraction grating on a surface for headlamps of vehicles, the method comprising the step of;
   combining the lens with a light source,
   wherein a phase function of the diffraction grating is represented by $$\phi(r) = \sum_{i=1}^{N} \beta_{2i} r^{2i}$$

where r represents distance from the central axis of the lens, $\beta$ represents coefficients, and N and i represent natural numbers, and the relationship $|\beta_2|\cdot(0.3R)^2 < |\beta_4|\cdot(0.3R)^4$ is satisfied where R represents effective radius of the lens, and
   wherein a second derivative of the phase function represented using r has at least one extreme value and at least one point of inflection in the range of r where r is greater than 30% of the effective radius of the lens, a difference in spherical aberration between the maximum value and the minimum value for any value of wavelength of visible light at any value of r in the range $0 \leq r \leq R$ is equal to or less than the longitudinal chromatic aberration for any value of wavelength of visible light, the diffraction grating is at least partially on the surface in the range of r where r is greater than 30%, and the relationship $$1 < \left|\frac{\phi(R)}{R^2}\right| < 10$$

is satisfied.

* * * * *